US011001437B2

(12) United States Patent
Wicks et al.

(10) Patent No.: US 11,001,437 B2
(45) Date of Patent: May 11, 2021

(54) BEVERAGE PREPARATION SYSTEM AND CAPSULES

(71) Applicant: Lavazza Professional North America, LLC, West Chester, PA (US)

(72) Inventors: David X. Wicks, Basingstoke (GB); David P. Knowles, Basingstoke (GB); Tony McCoy, Basingstoke (GB); Samuel Hyde-Hart, London (GB)

(73) Assignee: Lavazza Professional North America, LLC, West Chester, PA (US)

( * ) Notice: Subject to any disclaimer, the term of this patent is extended or adjusted under 35 U.S.C. 154(b) by 103 days.

(21) Appl. No.: 16/060,617

(22) PCT Filed: Dec. 9, 2016

(86) PCT No.: PCT/GB2016/053894
§ 371 (c)(1),
(2) Date: Jun. 8, 2018

(87) PCT Pub. No.: WO2017/098267
PCT Pub. Date: Jun. 15, 2017

(65) Prior Publication Data
US 2019/0002192 A1 Jan. 3, 2019

(30) Foreign Application Priority Data
Dec. 11, 2015 (GB) .................................. 1521882

(51) Int. Cl.
*B65D 85/80* (2006.01)
*A47J 31/06* (2006.01)
(Continued)

(52) U.S. Cl.
CPC ...... *B65D 85/8043* (2013.01); *A47J 31/0668* (2013.01); *A47J 31/407* (2013.01); *B65D 81/3211* (2013.01); *B65D 81/3288* (2013.01)

(58) Field of Classification Search
CPC .............. B65D 85/8043; B65D 85/804; B65D 85/8046; B65D 81/3211; B65D 81/3288;
(Continued)

(56) References Cited

U.S. PATENT DOCUMENTS

| 3,892,867 A | 7/1975 | Schoonman |
| 4,853,234 A | 8/1989 | Bentley et al. |

(Continued)

FOREIGN PATENT DOCUMENTS

| CN | 2367575 Y | 3/2000 |
| CN | 100480150 C | 3/2006 |

(Continued)

OTHER PUBLICATIONS

European Search Report for Related Application No. 16813024.3, dated Aug. 12, 2019.

(Continued)

*Primary Examiner* — Ericson M Lachica
(74) *Attorney, Agent, or Firm* — The Belles Group PC

(57) ABSTRACT

A system for the preparation of a multi-component food product, such as coffee, tea, soup or baby food. The system comprises two or more capsules (300,400), each capsule providing a component of the multi-component food product, each capsule having an inlet region for receiving liquid into the capsule and an outlet region (330) for dispensing liquid from the capsule, wherein the outlet region of a first capsule is configured to mate with the inlet region of a second capsule, such that the first and second capsules may be connected in fluid communication.

15 Claims, 5 Drawing Sheets

(51) Int. Cl.
*A47J 31/40* (2006.01)
*B65D 81/32* (2006.01)
*B65D 85/804* (2006.01)

(58) Field of Classification Search
CPC ............... B65D 81/32; B65D 81/3205; B65D 81/3216; B65D 81/3222; B65D 81/3227; B65D 81/3233; B65D 81/3238; B65D 81/3244; B65D 81/325; B65D 81/3255; B65D 81/3261; B65D 81/3266; B65D 81/3272; B65D 81/3277; B65D 81/3283; B65D 81/3294; A47J 31/0668; A47J 31/407; A47J 331/0673; A47J 31/0678; A47J 31/06; A47J 31/40
See application file for complete search history.

(56) References Cited

U.S. PATENT DOCUMENTS

| | | | |
|---|---|---|---|
| 5,108,768 A * | 4/1992 | So | B65D 85/8043 206/519 |
| 5,325,765 A | 7/1994 | Sylvan et al. | |
| 5,402,707 A | 4/1995 | Fond et al. | |
| 6,025,000 A | 2/2000 | Fond et al. | |
| 6,079,315 A | 6/2000 | Beaulieu et al. | |
| 6,082,247 A | 7/2000 | Beaulieu et al. | |
| 6,142,063 A | 11/2000 | Beaulieu et al. | |
| 6,186,051 B1 | 2/2001 | Aarts | |
| 6,606,938 B2 | 8/2003 | Taylor | |
| 6,726,950 B2 | 4/2004 | Yuzawa | |
| 6,805,041 B2 | 10/2004 | Colston et al. | |
| 7,347,138 B2 | 3/2008 | Bragg et al. | |
| 8,151,694 B2 | 4/2012 | Jacobs et al. | |
| 9,776,789 B2 | 10/2017 | Talon | |
| 2005/0266122 A1 | 12/2005 | Franceschi | |
| 2006/0065127 A1 | 3/2006 | Dalton et al. | |
| 2009/0004335 A1 | 1/2009 | MacMahon et al. | |
| 2009/0235827 A1 * | 9/2009 | Bongers | B65D 85/8043 99/316 |
| 2010/0154647 A1 * | 6/2010 | Skalski | A47J 31/0668 99/290 |
| 2010/0288133 A1 * | 11/2010 | Litzka | B65D 85/8043 99/299 |
| 2013/0118945 A1 * | 5/2013 | Furey | B23P 11/00 206/520 |
| 2013/0129870 A1 * | 5/2013 | Novak | B65D 85/73 426/115 |
| 2014/0106036 A1 | 4/2014 | Cardoso | |
| 2014/0220191 A1 | 8/2014 | Kelly et al. | |
| 2015/0068405 A1 | 3/2015 | Bartoli et al. | |
| 2015/0259134 A1 * | 9/2015 | Mack | B65D 65/466 426/112 |
| 2015/0307266 A1 * | 10/2015 | Zanetti | B65D 85/8043 426/112 |
| 2017/0156541 A1 * | 6/2017 | Bae | A47J 31/06 |

FOREIGN PATENT DOCUMENTS

| | | |
|---|---|---|
| CN | 1997568 A | 7/2007 |
| CN | 103748022 A | 4/2014 |
| CN | 104411600 A | 3/2015 |
| CN | 104995107 A | 10/2015 |
| CN | 106103311 A | 11/2016 |
| EP | 0179641 | 4/1986 |
| EP | 0272922 | 6/1988 |
| EP | 0468079 | 1/1992 |
| EP | 0512468 | 1/1997 |
| EP | 0821906 | 2/1998 |
| EP | 2030915 A2 | 3/2009 |
| FR | 2556323 A1 | 6/1985 |
| WO | 9401344 A1 | 1/1994 |
| WO | 0219875 A1 | 3/2002 |
| WO | 2004071899 A1 | 8/2004 |
| WO | 2006043108 A1 | 4/2006 |
| WO | 2013008012 A2 | 1/2013 |
| WO | 2013156932 A1 | 10/2013 |
| WO | WO 2013/156932 A1 | 10/2013 |
| WO | 2014057094 A1 | 4/2014 |

OTHER PUBLICATIONS

Chinese Search Report Issued with Office Action for related Application No. 2016800718160 dated Feb. 6, 2020.

Chinese Search Report issued for related application No. 2016800718160, dated Oct. 19, 2020.

* cited by examiner

FIG. 1 *(prior art)*
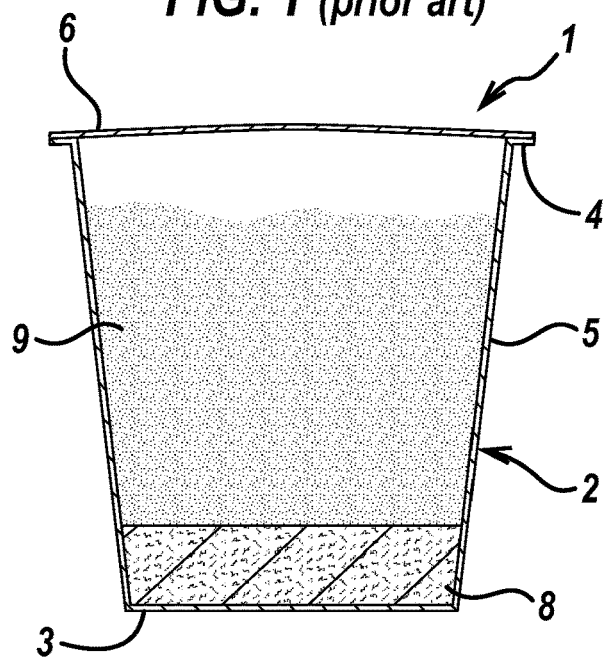
FIG. 2 *(prior art)*
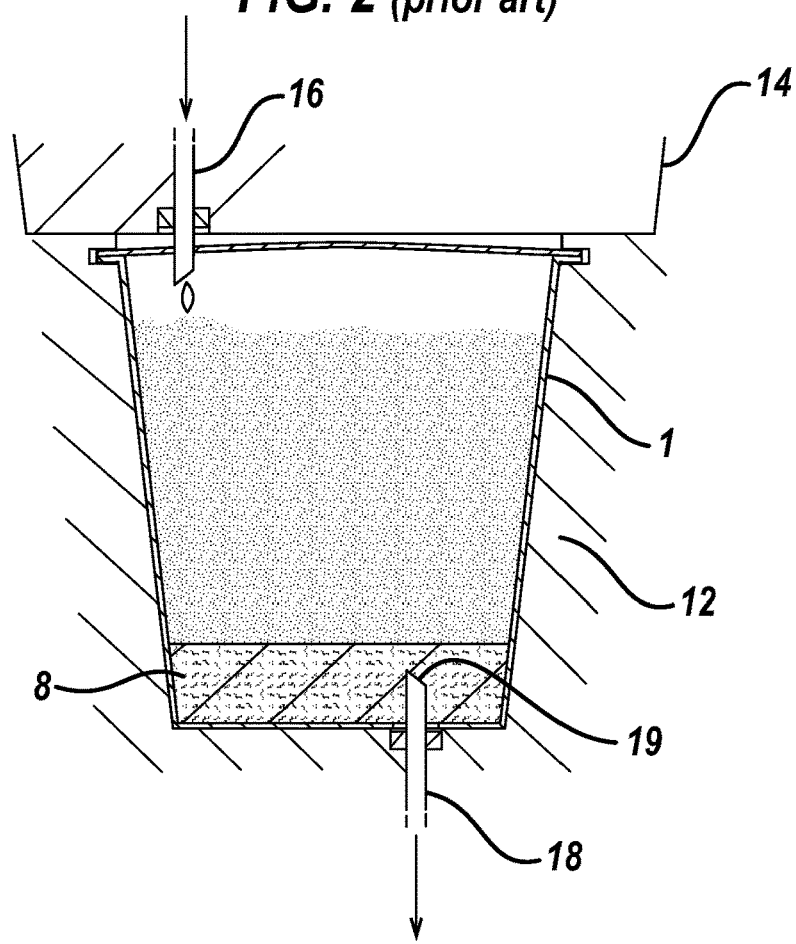

BEVERAGE PREPARATION SYSTEM AND CAPSULES

CROSS-REFERENCE TO RELATED APPLICATIONS

This application is a national stage application, filed under 35 U.S.C. § 371, of International Application No. PCT/GB2016/053894, filed Dec. 9, 2016, which claims priority to GB Patent App. Serial No 1521882 9, filed on Dec. 11, 2015, the entire contents of each hereby being incorporated by reference herein for any and all purposes.

The present invention relates to a system of capsules for the preparation of multi-component food products, such as coffee, tea, soup or baby food.

Capsules have been used in a number of food making systems, in particular beverage making systems wherein a capsule containing a particulate beverage making ingredient (such as ground coffee) is inserted into a beverage making station of a beverage making apparatus. The apparatus then injects water into the capsule and the beverage making ingredient dissolves in, or infuses into, the water to form the beverage. The beverage flows out of the capsule through a suitable outlet, which may simply be an opening or perforation in the capsule, or it may comprise an outlet tube that pierces an outlet region of the capsule. The capsule may incorporate a filter to prevent passage of solid components such as coffee grounds out of the capsule. Beverage making systems of this general type are described in WO94/01344, EP-A-0512468 and EP-A-0468079 (all Nestle), in EP-A-0272922 (Kenco), in EP-A-0821906 (Sara Lee) and in EP-A-0179641 and WO02/19875 (Mars).

For example, FR-A-2556323 describes a capsule for the preparation of drinks, such as coffee, tea and other infusions, that includes an impermeable, yieldably pierceable, frusto-conical base having an open, flanged top and a closed, yieldably pierceable bottom. A beverage making ingredient such as ground roasted coffee is provided in the capsule, and the top of the capsule is covered in a sealed manner at its top by a pierceable cover and closed at its bottom by a filter sheet. The filter sheet may be profiled to provide a liquid outflow chamber in the bottom of the capsule. In use, the top of the capsule is pierced by a water injection tube, and the bottom of the capsule below the filter sheet is pierced by a beverage extraction tube.

Beverage making capsules of the above type have found widespread use. However, they suffer from certain drawbacks. The manufacture of these capsules requires assembly of an appropriately shaped base, filter and lid in a precise and secure manner. The rate of flow of the beverage through the ingredient and/or the filter sheet may not be as fast and/or as uniform as would be desirable for optimum beverage preparation. A difficulty that can arise with the above systems is incomplete dissolution or extraction of the beverage ingredients inside the capsule, for example due to channelling of water through the bed of ingredient inside the capsule. Another difficulty that can arise is excessive system backpressure due to blocking of the filter by the particulate ingredient inside the capsule. In addition the filter sheet can become relatively weak when wet, and can burst unless structural elements are provided to support the filter sheet during beverage preparation. Finally, the capsules require a significant quantity of packaging material and are difficult to recycle, since recycling requires separation of the spent beverage ingredient (e.g. coffee grounds) from the plastic components before recycling.

Other dispensing systems are manufactured by Keurig, Inc. of Wakefield, Mass. and are exemplified by U.S. Pat. Nos. 6,082,247, 6,142,063, 8,151,694, 6,079,315, 5,325,765, 6,606,938, and 7,347,138. All of these Keurig systems use a pod or container which is placed in a receiving cavity and then punctured by an over-the-centre lever activated puncturing device. This both punctures the top of the pod to admit hot fluids and punctures the bottom of the pod to allow the brewed beverage to drain through the bottom of the pod to a waiting cup.

Some attempts have been made to deliver dairy and milk to a brewed beverage such as coffee or cocoa in a compact and low cost way. Most attempts have focussed on using a brewing chamber and dispensing either a powdered dairy product or a milk solution through the same nozzle connected to the brewing chamber. Other attempts have used a coffee-carrying pouch, through which hot water is passed to obtain the brewed coffee. This is followed by swapping out the coffee pouch with a container containing milk powder, with the contents then delivered to an underlying cup. There have also been milk delivery systems that use a separate dispensing mechanism on the side of a coffee dispenser. In this case, the separate dispensing system constitutes a separate disconnected system where fresh milk is poured into a container and then dispensed separately into the same cup used to collect the coffee or espresso.

However, the aforementioned systems are unsuitable or unsatisfactory for preparing multi-component food products. They particularly suffer from a lack of flexibility when a variety of different combinations of food components may be desired.

For example, in coffee products and hot chocolate it is often desirable to mix milk or a milk product with the coffee or chocolate, to make a latte, cappuccino, mocha or hot chocolate. It can also be desirable to introduce other components, such as flavourings (hazelnut, chocolate, mint etc.). In juice or smoothie products, it can be desirable to introduce additives such as protein, whey or vitamins. Alternatively, an alcoholic spirit such as vodka, whiskey or gin may be added to coffee or fruit juice.

One system for making a multi-component food product is described in U.S. Pat. No. 6,726,950 in which coffee and frothed milk are prepared separately before being combined, which adds to the complexity of the system. As shown in this patent, a coffee brewer dispenses its brewed coffee into a cup by injecting hot water into ground coffee so as to produce the brewed coffee. At the same time a liquid milk supply is refrigerated, with the milk supplied to a Venturi assembly in which steam is introduced along with the milk to produce a frothed milk solution. Thereafter the frothed milk is deposited over the top of the brewed coffee to provide either a latte or cappuccino. However, in this system refrigeration is required to prevent spoilage of the milk product. Moreover, if the same jets are utilized to dispense the brewed beverage and the milk, the machine may become contaminated with milk which may spoil over time. The spoilage of milk introduces bacteria and other types of toxins which can make future drinks taste bad or can have negative effects on the people who are consuming the beverages.

Despite the aforementioned attempts, all of these systems suffer from the drawback that there is no flexibility in the combination of components in a desired multi-component food product. A whole range of capsules would need to be provided, with each one dedicated to a specific multi-component food product. Not only is this undesirable in terms of the number of distinct capsules which must be provided by the manufacturer, but it also reduces the freedom of the consumer to choose their own multi-component food product.

Thus, what is needed is a new system, which can cater to a variety of multi-component food products with greater convenience, reduced cost, and greater consumer freedom. Moreover, it would be desirable if such a system did not require the refrigeration of spoilable components, such as milk or milk-like products.

SUMMARY OF INVENTION

The present invention provides a system for the preparation of a multi-component food product, said system comprising two or more capsules, each capsule for providing a component of the multi-component food product, each capsule having an inlet region for receiving liquid into the capsule and an outlet region for dispensing liquid from the capsule, wherein the outlet region of a first capsule is configured to mate with the inlet region of a second capsule, such that the first and second capsules may be connected in fluid communication.

In this way, a consumer may prepare a wide variety of different food products using the same system of the present invention, because the capsules of the system can be combined in a variety of different ways. Thus, the system of the present invention can be viewed as a modular system in which each capsule is a module representing an independent unit, or preferably a standardized part, that can be used to construct a more complex structure, namely a multi-component food preparation unit.

It will be appreciated that the term "food product" means any nutritious substance that can be eaten or drunk, including for example beverages, soups, baby-food and pet-food. Indeed, the system of the present invention is particularly well suited for the preparation of beverages. Moreover the term "component" (of a food product) includes any part of a food product, even if the component may not be classified as a food product in itself (in that the component may not necessarily be calorific or nutritious in isolation). For example, a component of a food product could be an additive, a supplement, flavouring or colourant, which may not strictly be classified as a food itself, but may be a component of a food. The component could even be a gas, where this gas is the frothing component of a frothed food product.

As such, the potential number of different food products which can be prepared by the system of the present invention far exceeds the number of different types of capsule (in that each type of capsule would contain a different component of the food product). This is because each end-result food product does not require its own dedicated capsule. For example, three different types of capsules, being a coffee capsule "C", a milk capsule "M" and a flavouring capsule "F" can provide many different beverages, such as: black coffee (C alone), white coffee (C+M), flavoured black coffee (C+F), flavoured white coffee (C+M+F), double strength black coffee (C+C), double strength white coffee (C+C+M), double strength flavoured coffee (C+C+F) or flavoured milk (M+F). From system of only three different types of capsule, any of the aforementioned eight different beverages can be prepared. Traditionally, eight different beverages would have required eight different capsules.

Preferably, the first and second capsules referred to above may be connected by a friction fit, screw fit, snap fit, or interlocking fit. This provides a convenient means for a consumer to connect (and if necessary disconnect) capsules to create their desired combination.

Preferably, each capsule is individually sealed before use. This is useful in the event that the content of the capsule is perishable, for example a dairy product, such as milk or cream. By individually sealing each capsule, the contents of the capsule are not exposed to the external atmosphere until the seal of the capsule is broken, and the usable life of the contents is substantially improved. For example, it has been found that dairy products may be stored virtually indefinitely if the container in which they are stored is sealed sufficiently well such that there is no oxygen left in the container after filling. Alternatively, the capsule may be partially filled with the dairy product and the remaining space filled with nitrogen. Thus, the fact that the dairy product can be sealed in a single serve capsule has the advantage that there is no spoilage, such that no refrigeration is required.

Preferably, the outlet region of the aforementioned first capsule comprises a piercing means for piercing the inlet region of the aforementioned second capsule. It is convenient if the piercing means of the first capsule is actuated to piece the second capsule by the action of mating the first capsule with the second capsule and if the inlet region of the second capsule comprises a pierceable film or membrane. In this way, the seal or impermeable side wall of the second capsule can be broken by the action of pressing the outlet of the first capsule into the inlet of the second capsule, such that no separate piercing means is required. In this way, a fluid connection between the two capsules is most easily provided, without risk of spilling the contents of the capsules.

Conveniently, each capsule is substantially frustoconical in shape. This shape is particularly advantageous for brewable-type ingredients, since the surface of the ingredient exposed to beverage making liquid is maximised, but the channelling of the liquid out of the base of the capsule is controlled and more direct. This shape is also advantageous in that capsules of the present invention can be used in existing beverage preparation apparatuses. A substantially frustoconical shape is also useful to allow stacking of capsules, with a top capsule nesting within the top opening of a bottom capsule. It will therefore be appreciated that the stacking of frustoconical shaped capsules occurs where the narrower base of a top capsule nests within a wider top opening of a bottom capsule (such as shown in FIGS. 4 and 6).

In some embodiments, each capsule of the present invention comprises a thermoformed cup-shaped base portion and a top cover sheet bonded across the top of said base portion. This structure is advantageously strong, relatively light, sealed from the outside environment and the top cover sheet is conveniently pierceable.

In some embodiments, the capsules may be stackable. This feature is particularly preferred to assist in the stable mating of capsules arranged in a vertical stack. This can be achieved for example with capsules of a substantially frustoconical shape, where the narrower base of a top capsule may nest within a wider top opening of a bottom capsule (such as shown in FIGS. 4 and 6). Alternatively, the capsules may be connectable in a side-by-side arrangement, optionally with an interengaging fit. Moreover, the dimensions of the capsules when combined may provide an overall size and shape which is substantially similar to a conventional single capsule, so that the combined capsules may be used in a conventional beverage preparation apparatus without the need for substantial modification.

In some embodiments, some capsules may comprise a filter. Preferably those capsules which contain a brewable beverage ingredient will use a filter. A filter is useful when making brewable type beverages, such as ground coffee or leaf tea, where residual waste product is preferably separated from the extracted food product or beverage. The filter may be provided as a layer of filter material retained in abutment with the bottom of said capsule by an adhesive, or by a retaining bead on an inside surface of the capsule, or by both of these means.

Suitable materials for forming the filter are water-insoluble but preferably hydrophilic, food-acceptable materials. For example, they may comprise a liquid-permeable foam material such as a polyurethane foam or an open-cell polyolefin foam. More suitably, the filter comprises or consists essentially of fibers of substantially water-insoluble material, for example a woven or nonwoven fabric. The fibers making up the filter may be any suitable food-acceptable fibers such as cellulose fibers, polyolefin fibers or nylon fibers.

In certain embodiments, the filter may comprise or consist essentially of a compostable material. The term "compostable" signifies that the material is substantially broken down within a few months, preferably within a few weeks, when it is composted. Typically, the material is at least about 90% composted within six months, as determined by the method of ISO14855, as in EN13432. Thermoplastic compostable polymers that could be used for the matrix filter include polymers and copolymers of lactic acid and glycolic acid, polyhydroxybutyrates, polyvinyl alcohols (PVOH), ethylene vinyl alcohols (EVOH), starch derivatives, cellulose and cellulose derivatives, and mixtures thereof.

Suitably, the filter comprises or consists essentially of one or more nonwoven textile webs or bodies. That is to say, a fibrous web or body characterized by entanglement or point bonding of the fibers. The nonwoven web or body may, for example, comprise or consist essentially of a web prepared by conventional techniques such as air laying, carding, needling, melt-blowing, or spun-bond processes, or combinations of two or more of such processes. The integrity of the web may be increased by melt-bonding of the fibers, for example achieved by the melt-blowing method or by thermal bonding of thermoplastic (e.g. bicomponent) fibers.

In some embodiments, some capsules may comprise a frother (foamer). Preferably, those capsules which contain a dairy product may use a frother. This is desirable, because some beverages require a frothy character or head, such as cappuccino. However, it is also envisaged that a frother capsule could be provided that does not contain a food product per se, but introduces the component of froth to the food product (i.e. introduces air bubbles). This is advantageous in that it gives a consumer a further option to have a flat milky coffee (e.g. flat white coffee, café au lait) versus frothy milky coffee (e.g. cappuccino or macchiato), depending on whether a frother capsule is used in addition to a milk capsule. Preferably, the frother is provided by means of a screen mesh located inside the capsule body and bisecting the direction of flow of liquid through the capsule. For example, a dairy product may be frothed by providing a series of spaced apart screens at the base of the pod and a frangible or breakable pouch of dairy product above the screens. When the pouch is broken, for instance by hot liquid, the milk is ejected from of the pouch and is frothed by forcing the milk against the screens and into the base of the pod which forms a frothing chamber. Of course, it is also envisaged that a frother could be used with other components, such as to make frothed fruit juices or cocktails.

In some embodiments, it may be useful for the inlet region of a capsule intended to receive liquid from a food or beverage making apparatus to not be mateable with the outlet regions of other capsules in the system. For example, the means of mating the capsule can be omitted in the inlet region, or a projection could be provided in the inlet region to prevent mating thereto. This would be useful if the capsule was intended for use only as a "start" capsule in a sequence of capsules, such as for containing an ingredient which must be brewed with the hottest liquid, as soon as the liquid is injected from a food or beverage making apparatus. In this way, a consumer would not be able to use the dedicated "start capsule" in an intermediate or end position in a sequence of capsules, because this could, for example, cause detrimental effects to the brewing of the ingredient in the start capsule.

In some embodiments, the outlet region of a capsule intended to dispense food product to a food or beverage receptacle may not be mateable with the inlet regions of other capsules in the system. Similar to the above "start" capsule, this would be a dedicated "stop" capsule, only suitable for use at the end of a sequence of capsules. For example, a stop capsule may be used to deposit a foam or may contain an ingredient which is degraded by exposure to excessively hot liquid.

In some embodiments, there may be provided a capsule which comprises two inlet regions. This capsule would act as a combining junction, such that the flow of liquid from two inlets is combined into a single outlet. This could be useful where two different ingredients must be brewed separately, for example with equally hot water, but are then later combined.

Alternatively, or additionally, there may be provided a capsule which comprises two outlet regions. This capsule would act as a dividing junction, such that the capsule divides the flow of liquid from one inlet into two outlets. This could be useful if more than one drink is being made at the same time.

Alternatively, at least two, or substantially all (or all) of the capsules in the system have the same external shape. This is useful to provide maximum freedom to a consumer to make any combinations of capsules and improves the simplicity of the system for manufacture, storage and use.

In some embodiments, at least a part of the outlet region of a capsule is made of a liquid-permeable material and preferably the capsule is enclosed in one or more air- and moisture-impermeable packages. This can be useful so that it is not necessary to pierce the outlet region of the capsule, because liquid can permeate through the capsule wall itself. It is also envisaged that the permeable material could act as a filter. Permeable in this context would include the provision of small holes formed, for example, by laser perforation of the capsule.

Alternatively, the outlet region of a capsule may be formed from an air- and moisture-impermeable material, but the capsule would comprise an outlet closed by a releasable seal, for example a heat degradable adhesive. In this way, the capsule would be sealed before use, but the outlet could be opened either manually immediately before use, or automatically during use, to allow the component to be dispensed from the capsule. This embodiment would be useful where a separate impermeable package is not provided, and yet a simple and effective solution for opening the outlet region of the capsule is desired. Such a capsule could be provided as a dedicated end or "stop" capsule in a sequence of capsules, particularly if other capsules in the system do not comprise such a releasable outlet seal.

In another embodiment, a hole may be located in the bottom of a capsule for means of inserting an outlet tube from a food or beverage making apparatus into the outlet region of the capsule. Alternatively, the bottom of the capsule may be yieldably pierceable by an outlet tube provided by a food or beverage making apparatus.

Preferably, the capsules are single use, in that once they are used to prepare a food product they are discarded. This improves convenience for a consumer and is generally more hygienic, with less risk of cross-contamination of food products. This is especially useful with respect to spoilable products such a dairy, which can leave a rancid residual taste, if provided in reusable containers that are not properly cleaned.

Preferably, the capsules are suitable to be evacuated by hot liquid or steam, preferably hot water.

Preferably, the capsules are beverage preparation capsules.

A variety of multi-component food products may be prepared using the system of the present invention. Examples include soup, baby-food, pet-food, coffee, tea, juice or any other food product containing a substantial amount of liquid.

A variety of food components may be contained in the capsules of the system of the present invention. Examples include ground coffee, instant coffee, leaf tea, soup, hot chocolate, juice, baby-food, pet-food, wine, alcoholic spirit, a food additive, a food extract, a food supplement such as protein or vitamin, flavouring agent, colouring agent, fortifying agent, texturing agent, sweetener, particulate whitener, anti-oxidant, effervescent, and a dairy product such as milk or cream. Each of these components is typically provided in a different capsule, but numerous combinations of such components can be provided by combining multiple capsules in various ways.

Thus, each capsule of the system preferably provides a component of the multi-component food product. However, it should be understood that the term "component" in this context is not limited to a food product per se. A component could be an additive, a supplement, or a flavouring, which may not strictly be classified as a food (in that it is not calorific or nutritious), but may be a component of a food. The component could even be a gas, which provides the component property of froth or fizz to a food. Moreover, each capsule of the system need not contain a different component, since it may be desirable to join two capsules of the same component to provide a double-strength addition of this component to the end food product.

Preferably, the multi-component food product may be coffee or tea, and at least one capsule may contain brewable coffee or tea, at least one capsule may contain a dairy product such as milk or cream, and optionally at least one capsule may contain a flavouring or food supplement.

Preferably, the multi-component food product may be baby-food, and at least one capsule may contain a first baby food, at least one capsule may contain a second baby food, and optionally at least one capsule may contain a flavouring or food supplement.

Preferably, the dimensions of a combination of multiple capsules, suitably two or three capsules connected together, provide an overall size and shape which is substantially similar to an existing capsule, such that the combined capsules of the present invention may be used in an existing food or beverage preparation equipment without modification of the equipment.

Typically, each capsule may comprise at least one sheet of plastic and/or metal foil material. The sheet may be semi-rigid, e.g. thermoformed or injection moulded, or it may be a flexible film material. The sheet or flexible film material may be a laminate comprising at least one of the following layers: a thermoplastic sealant layer for bonding the sheet to other members of the capsule; a substantially gas-impermeable barrier layer, which suitably is a metal film such as aluminium film; adhesion layers to improve adhesion between other layers of the laminate; structural layers, for example to provide puncture resistance; and/or a printing substrate layer. The structural layers could be made of polyolefins, polystyrene, polyester, nylons, or other polymers as is well known in the art.

In one group of embodiments, the capsules may comprise a first sheet that has been formed, e.g. by thermoforming, into a cup or bowl shape with a flanged rim, and a second sheet that is bonded across the flanged rim to form the capsule. For example, the first sheet may be a relatively stiff thermoplastic sheet that has been thermoformed into a cup or bowl shape with a flanged rim, and the second sheet is a flat sheet, which may be of flexible film material, that is bonded across the flanged rim. In these embodiments, the capsule may have a frustoconical shape, suitably with a pierceable top and base. The bottom of the capsule is pierceable or otherwise provided with means for insertion of an outlet tube into the filter layer, for example a hole with a removable cover or a hinged cover, or a septum, or a split septum, or a nozzle with a frangible freshness barrier for example as described in WO-A-0219875.

In another aspect of the invention, there is a provided a capsule for use in the system discussed above. The capsule has an inlet region for receiving fluid into the capsule and an outlet region for dispensing fluid from the capsule, wherein either the outlet region is configured to mate with the inlet region of a complementary capsule, or the inlet region is configured to mate with the outlet region of a complementary capsule, or both, such that the capsule and complementary capsules may be connected in fluid communication.

Preferably, the outlet region of the aforementioned capsule is configured to mate with an inlet region that is identical to its own inlet region, and consequently that the inlet region of the aforementioned capsule is configured to mate with an outlet region that is identical to its own outlet region.

Preferably, the capsule contains a component of a multi-component food product.

Another aspect of the invention concerns a method of preparing a multi-component food product using a capsule system, comprising the steps of: selecting a first capsule containing a component of the desired multi-component food product, selecting a second capsule containing a component of the desired multi-component food product, optionally selecting one or more additional capsules containing components of the desired multi-component food product, mating the outlet region of the first capsule with the inlet region of the second capsule, optionally mating the outlet region of second capsule with the inlet region of an additional capsule, and continuing to mate the outlet region of each previous capsule with the inlet region of the next capsule until all capsules are connected in sequence and in fluid communication, injecting a liquid into the inlet region of the first capsule, allowing the liquid to pass through each capsule sequentially, allowing the multi-component food product to escape from the outlet region of the last capsule in the sequence.

Preferably, the method may comprise the step of piercing the inlet region of the first capsule with an inlet tube and/or piercing the outlet region of the last capsule with an outlet tube.

The aforementioned liquid is preferably an aqueous liquid, usually water, for example at a temperature of 85° C. to 99° C. Preferably, the liquid is introduced into the first capsule under pressure.

In one embodiment, the capsules may be punctured by an over the centre apparatus that punctures the first-most capsule and last-most capsule in a sequence of capsules with one lever action. The pressure applied by the lever could also be used to force the capsules together such that the outlet regions of the capsules pierce the inlet regions of later capsules.

As explained above, the capsules can provide a variety of end food products, meaning that the specific structure and features of the capsules may vary depending on their intended use. However, for the purposes of illustration, a beverage preparation capsule will be discussed in more detail below.

In one embodiment, a beverage preparation capsule may be provided in the form of a sealed pod comprising: a sealed hollow body having a top inlet region for receiving fluid into the body, a bottom outlet region for dispensing fluid from the body, and a beverage preparation ingredient inside said body, wherein either the outlet region is configured to mate with the inlet region of a complementary pod, or the inlet region is configured to mate with the outlet region of a complementary pod, or both, such that the pod and complementary pod may be connected in fluid communication.

Preferably, a layer of filter material at least about 2 mm thick is located inside the body of the pod and abutting the bottom of said body. In particular adjacent to the location where an outlet tube is to be inserted into the pod. In this way, the filter material is supported by the bottom of the pod, such that the problem of bursting filter sheets is avoided. However, no such filter may be necessary for pods that contain fully soluble/dispersible ingredients such as milk, concentrated liquid milk, chocolate, etc.

The pods are easy to assemble, preferably by simply placing or gluing a layer of filter material into the bottom of the pod. Finally, the overall size of the pod required for a given amount of ingredient is reduced since the whole volume of the pod can be filled with the ingredient and optionally the filter layer.

The terms "top" and "bottom" herein are relative terms denoting the locations, respectively, where the water inlet and water outlet of the pod are located. If present, the filter layer is relatively thick, and abuts the inside surface of the pod. The thickness of the filter layer is suitably from about 2 mm to about 20 mm, for example from about 3 mm to about 15 mm, typically from about 5 mm to about 10 mm. The filter layer may suitably be secured to the inside surface of the pod body by an adhesive, or in other embodiments it may be held in place by retaining flanges on the inside of the pod body, or it may even be retained by a liquid-permeable sheet extending over the filter layer and bonded to an internal surface of the pod body around the periphery of the filter layer. The area of the filter layer is suitably from about 1 cm$^2$ to about 20 cm$^2$, for example from about 2 cm$^2$ to about 10 cm$^2$.

Suitably, the pod of the aforementioned embodiment contains sufficient beverage preparation ingredients for the preparation of a single portion of beverage, i.e. from about 25 to about 500 ml, preferably from about 100 ml to about 250 ml of beverage. For example, the pod may contain from about 2 g to about 25 g of ground coffee or from about 1 g to about 9 g of leaf tea. The internal volume of the pod is suitably from about 1 cm$^3$ to about 100 cm$^3$, for example from about 5 cm$^3$ to about 50 cm$^3$.

DETAILED DESCRIPTION

Specific embodiments of the present invention will now be described further, by way of example, with reference to the accompanying drawings, in which:

FIG. 1 shows a cross-sectional view through a beverage preparation capsule of the prior art;

FIG. 2 shows a schematic cross-sectional view through the capsule of FIG. 1 being used to prepare a beverage;

Figure 3:
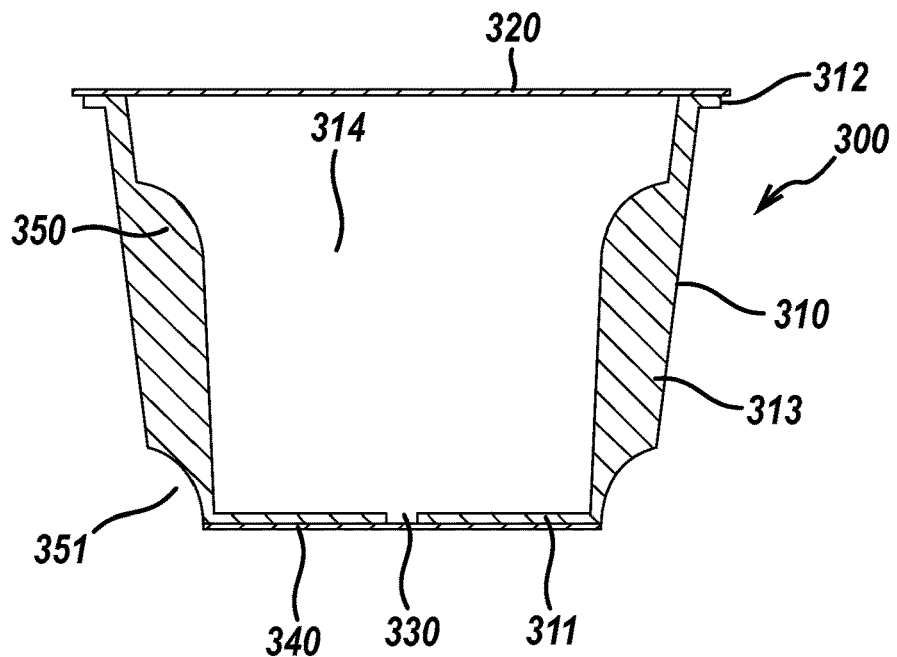
FIG. 3 shows a cross-sectional view through a capsule according to an embodiment of the present invention.

Referring to FIG. 1, the beverage preparation capsule 1 comprises a cup element 2 having a substantially flat base 3, a flanged top 4, and frustoconical side walls 5 extending from the base to the top 4. The cup element is formed for example by thermoforming from a suitable thermoplastic for example polystyrene. The thickness and material of the cup element are selected so that the cup element has sufficient rigidity to allow piercing of the base during beverage preparation, as described below, without collapse of the cup. The flanged top 4 of the cup is sealed with a flexible film lid 6 of a suitable laminate sheet material as hereinbefore described. The lid 6 is bonded to the lip 4 by melt bonding or adhesive bonding in conventional fashion.

A layer 8 of nonwoven textile filter material is provided inside the capsule 1 adjacent to the flat base 3. The layer 8 is approximately 10 mm thick, and may be bonded to the base 3 by a suitable water-insoluble adhesive (not shown). The beverage brewing ingredient 9, which in this embodiment is ground coffee is deposited on top of the filter layer 8 inside the capsule 1.

In use, the capsule 1 is held inside a clamp of a beverage making apparatus as shown in FIG. 2. The clamp has a lower part 12 with a recess for mating engagement with the cup element 2 of the capsule, and an upper clamp part 14 that is movable to abut the lid of the capsule. In this arrangement the capsule is completely enclosed by the clamp during beverage preparation, which permits the use of elevated pressures during beverage preparation without bursting the capsule. High water injection pressures can be used because there is no risk of bursting a filter sheet. Alternatively, the capsule may be merely gripped by a clamp but not fully enclosed thereby, or the flange 4 may simply be supported by an annular collar of the apparatus. The beverage preparation apparatus comprises a source of water (not shown), suitably a source of hot water, for supplying water to an injection tube 16 that pierces the lid of the capsule to inject water into the capsule for preparation of the beverage. The beverage preparation apparatus further comprises an outlet tube 18 that pierces the base of the capsule and projects a short distance into the capsule, whereby the open end 19 of the outlet tube is located entirely inside the filter layer 8. The inlet and outlet tubes may be in fixed spatial relationship to the respective clamp parts, in which case the piercing of the capsule takes place when the clamp is closed around the capsule. Alternatively, the inlet and outlet tubes may be associated with mechanisms to provide reciprocating motion of the respective tubes into the capsule after the capsule has been clamped, and out of the capsule after beverage preparation is complete. It will be appreciated that more than one inlet and/or outlet tube may be provided if appropriate.

Referring to FIG. 3, a capsule 300 of the present invention comprises a cup element 310 having a substantially flat base 311, a flanged top 312, and frustoconical side walls 313 extending from the base 311 to the top 312. Between these walls a hollow area 314 is provided inside the capsule, in which a food component or food component preparing structures may be contained (not shown). The cup element is formed for example by thermoforming from a suitable thermoplastic for example polystyrene. The flanged top 312 of the cup is sealed with a flexible film lid 320 of a suitable laminate sheet material as hereinbefore described. The lid 320 is bonded to the lip 312 by melt bonding or adhesive bonding in conventional fashion.

An outlet opening 330 is provided in the base 311 to allow the escape of liquid and food component from the capsule so that it may travel into a further capsule, or into a suitable food receptacle. In order to ensure that the capsule is sealed before use a flexible film 340 is provided over the outlet opening 330, thereby protecting the contents of the capsule from the external environment and preserving freshness of the contents.

The capsule is sealed to slow or eliminate spoilage of any food component therein by preventing ingress of air or oxygen. When filling the capsule with a food component, one option is to fill the capsule to the very top to eliminate any entrapped oxygen. Alternatively, a nitrogen bath may be applied above the component to remove any air.

The side wall 313 of the capsule is provided with an enlarged convex region 350 near the top of the capsule and a complementary recessed concave region 351 near the base of the capsule. Due to the frustoconical shape of the side walls 313, the base of the capsule can nest within the open top of an equivalent capsule. In this configuration (which can be seen in FIG. 4), the enlarged convex region 350 sits within the concave region 351 of an equivalent capsule so that the capsule are held together in a friction fit.

Figure 4:
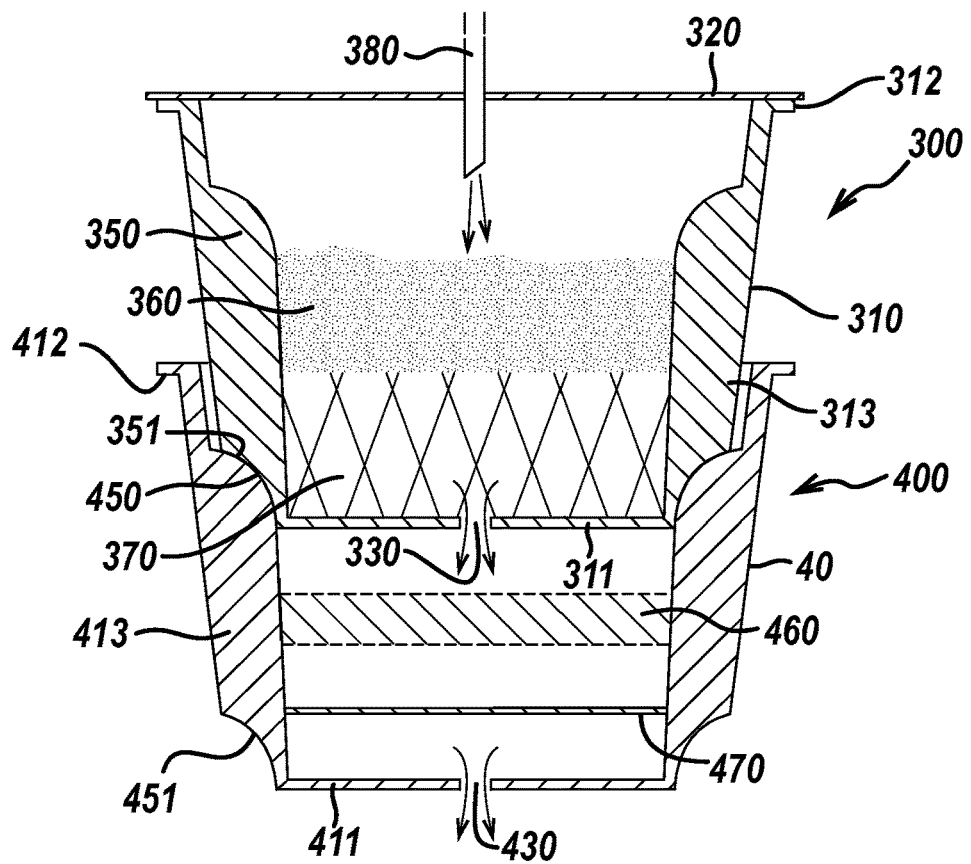
FIG. 4 shows a schematic cross-sectional view of a system according to an embodiment of the present invention comprising two capsules of the embodiment seen in FIG. 3 being used to prepare a beverage.

Thus, FIG. 4 shows a system of two capsules 300 and 400, each of the type shown in FIG. 3 and each having a cup element 310, 410, base 311, 411, flanged top 312, 412 and frustoconical side walls 313, 413. Capsule 300 is nested on top of and in frictional fit with bottom capsule 400, with the recessed concave region 351 of the top capsule engaging with the enlarged convex region 450 of the bottom capsule 400. In order to arrange the capsules 300 and 400 in this way, the flexible film 420 over the top of the bottom capsule has been removed by a user (and so is not shown). In addition, the flexible films (340, 440) over the outlet regions 330, 430 of the capsules have both been removed (and so are not shown), so that fluid can escape from the capsules in use.

In this example, the top capsule 300 contains a beverage brewing ingredient 360, such as ground coffee, and a layer of nonwoven textile filter material 370 provided inside the capsule 300 adjacent to the flat base 311. The layer of filter material 370 is approximately 10 mm thick, and may be bonded to the base 311 by a suitable water-insoluble adhesive (not shown). The beverage brewing ingredient 360 is deposited on top of the filter layer 370 inside the capsule 300. The bottom capsule 400 contains a dairy product 460, such as milk, contained within a ruptureable package (which may be ruptured by exposure to hot liquid) and a frothing device in the form of a screen mesh 470.

Although, these specific examples use a brewable beverage ingredient in one capsule and a dairy product in another capsule, it should be recognised that the invention is not so limited and a wide variety of components could be provided within the capsules of the invention. Moreover, although the system shown in FIG. 4 uses a combination of two capsules, it is also envisaged that a sequence of several capsules could be used, such as three capsules.

In use, the capsule system is held inside a clamp of a beverage making apparatus (not shown). The clamp has a lower part with a recess for mating engagement with the cup element 410 of the bottom-most capsule 400, and an upper clamp part that is movable to abut the lid 320 of the top-most capsule 300. In this arrangement the capsule system is completely enclosed by the clamp during beverage preparation, which permits the use of elevated pressures during beverage preparation without bursting the capsules. Alternatively, the capsule may be merely gripped by a clamp but not fully enclosed thereby, or one or both of the flanges 312, 412 may be supported by an annular collar of the apparatus. The beverage preparation apparatus comprises a source of water (not shown), suitably a source of hot water, for supplying water to an injection tube 380 that pierces the lid 320 of the top-most capsule 300 to inject water into the top-most capsule 300 for preparation of the beverage therein. The brewed beverage then passes through the filter material 370 of the top-most capsule and exits through the outlet 330 into the bottom-most capsule 400, where the hot beverage ruptures the packaged of dairy product 460 to form a mixture of brewed beverage and dairy product. This mixture is then passes through the screen mesh frother 470 in the lower regions of the bottom-most capsule 400 before the frothed beverage then escapes from the outlet 430 of the bottom-most capsule into a beverage receiving receptacle (not shown) ready for consumption.

It should be noted that the ordering of the capsules in relation to their contents can be an important factor. In the present example, a brewable beverage capsule is provided as the top-most capsule so that the brewable beverage is first exposed to the beverage making liquid when the liquid is at its hottest. Once the beverage passes into the second capsule containing a dairy product the liquid may have cooled somewhat, which is preferable for contact with a dairy product. Thus, it is envisaged that certain embodiments of the invention may include restrictions on the available combinations of capsules, such that brewable ingredient capsules must always be the first to be exposed to the hottest liquid, for example by preventing the engagement of a capsule into the inlet region of a brewable ingredient capsule, such as by provision of an additional blocking protrusion on the interior of the flanged rim of the capsule. Similarly, a dairy product capsule, preferably one with a frother, may need to be last in the sequence of capsules, such that the beverage liquid is coolest and the froth is not degraded by exposure to further ingredients or processing steps. Thus, the outlet of a frothing dairy product capsule may be prevented from engagement with another capsule, such as by provision of an additional blocking protrusion on the exterior of the base of the capsule.

Figure 5:
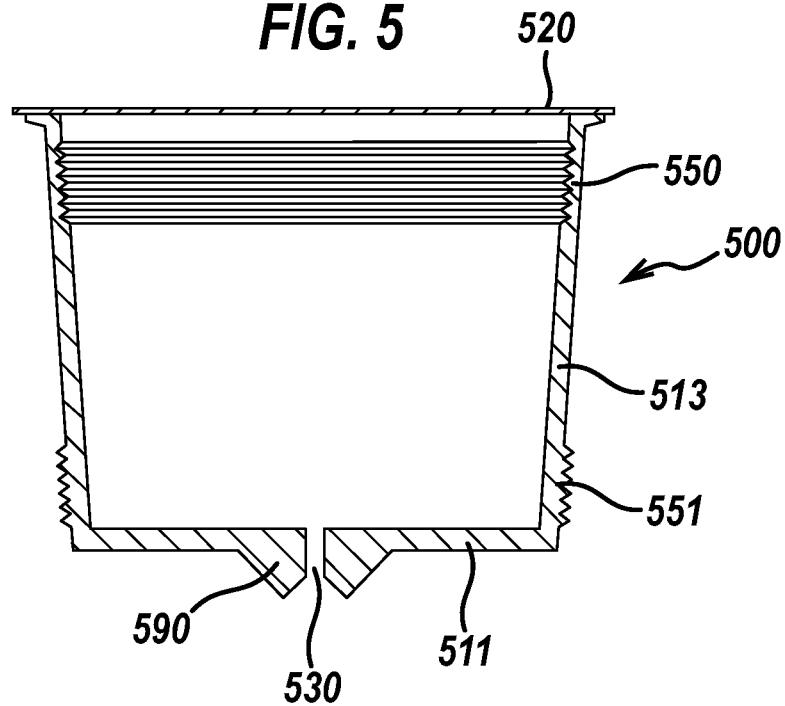
FIG. 5 shows a cross-sectional view through a capsule according to another embodiment of the present invention.

FIG. 5 shows an alternative embodiment of a capsule 500 of the present invention, which is substantially similar to that shown in FIGS. 3 and 4, but with a different means for securing the capsule to another capsule and an additional piercing means at the base of the capsule. Thus, the side wall 513 of the capsule 500 is provided with screw thread 550 near the top of the capsule and complementary screw thread 551 near the base 511 of the capsule 500. Due to the frustoconical shape of the side walls 513, the base 511 of the capsule 500 can nest within the open top of an equivalent capsule and the screw threads will engage to hold the capsules together in a screw fit.

The base 511 of the capsule 500 is provided with a relatively sharp outwardly projecting region 590 around the outlet 530. This projecting region is used to pierce the flexible film lid 620 of a corresponding capsule (see FIG. 6), meaning that the flexible film does not need to be removed before two capsules can be combined (in this case screwed together, but the projecting region could also be used with other embodiments, such as the one shown in FIGS. 3 and 4).

Figure 6:
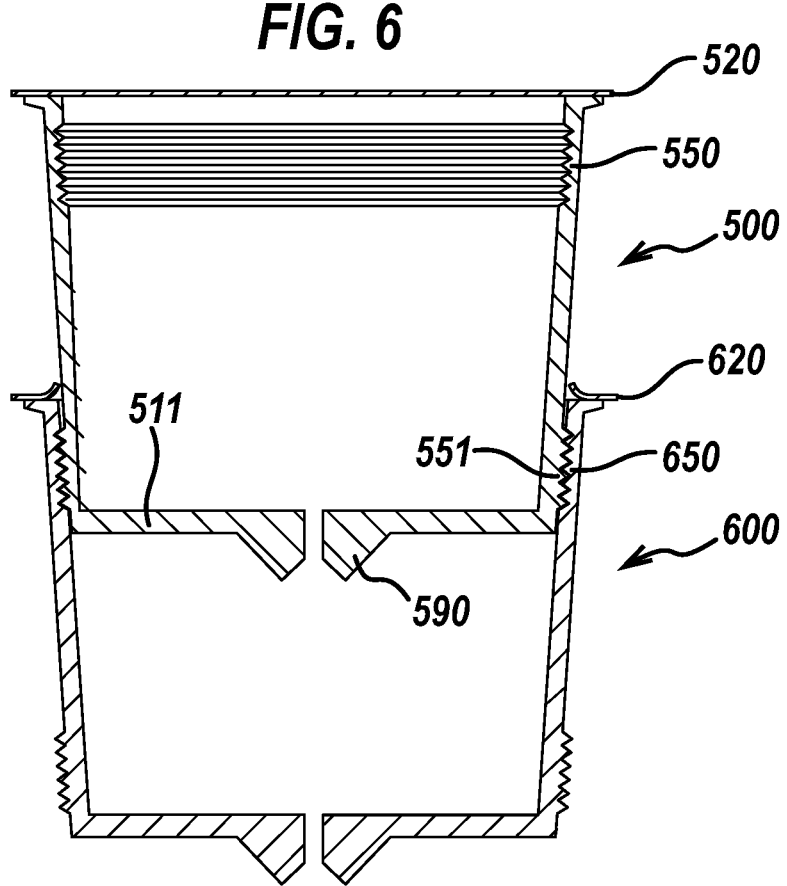
FIG. 6 shows a cross-sectional view of a system according to another embodiment of the present invention comprising two capsules of the embodiment seen in FIG. 5.

FIG. 6 shows a system of two capsules 500 and 600, each of the type shown in FIG. 5. The top-most capsule 500 is engaged with the bottom-most capsule 600 by pressing the projection region 590 of the top-most capsule 500 against the flexible film 620 of the bottom-most capsule until the film breaks (as shown in FIG. 6) and the base 511 of the top-most capsule can nest within the top opening of the bottom-most capsule 600. The screw thread 551 near the base of the side wall of the top-most capsule 500 engages with the screw thread 650 near the top of the side wall of the bottom-most capsule 600 and the capsules are screwed together. Once the two capsules are secured together in a screw fit, hot liquid can be injected through the top film 520 of the top-most capsule 500 in the manner previously described.

Figure 7:
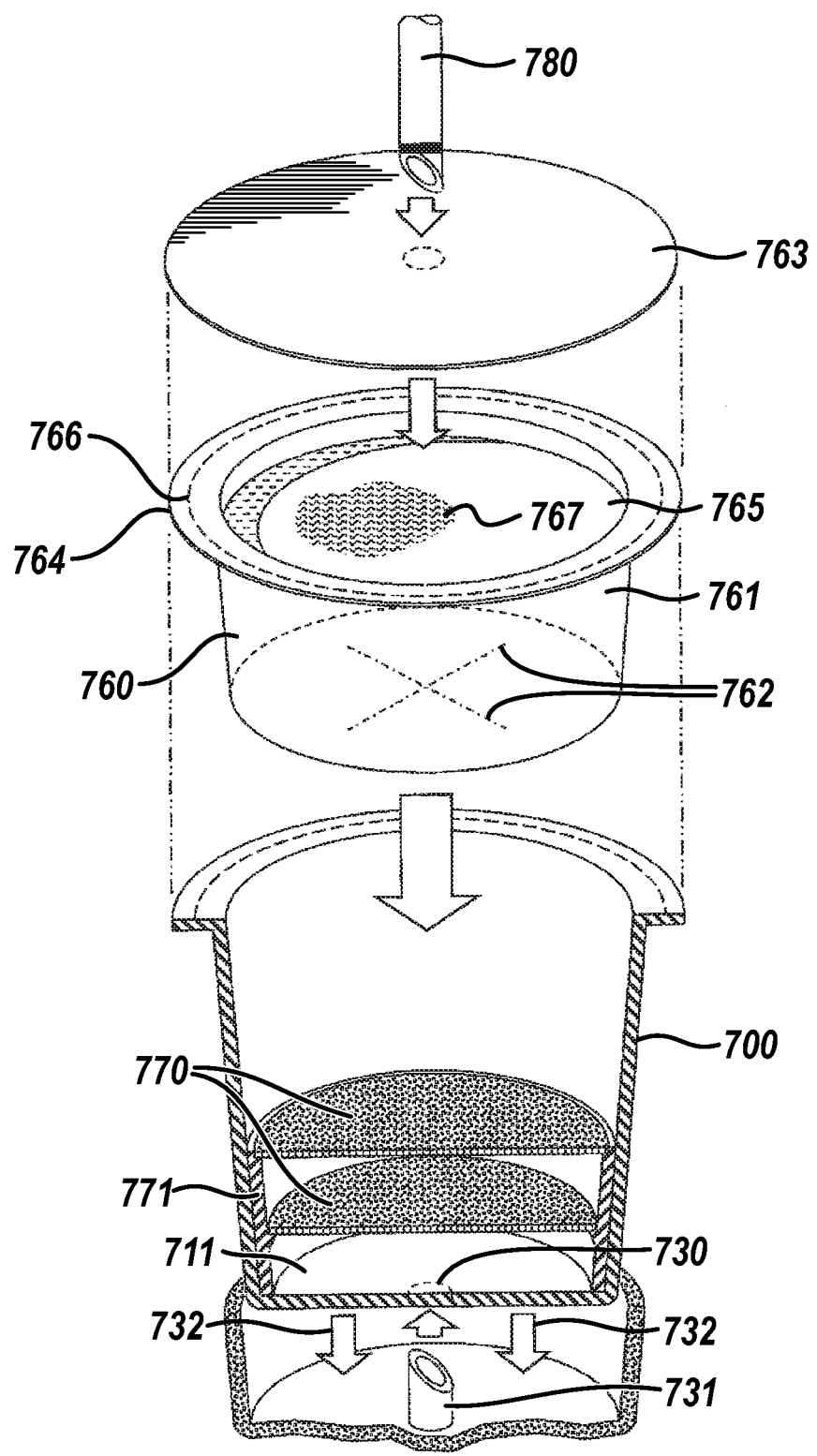
FIG. 7 shows a schematic view of a dairy pod with inbuilt frothing device.

FIG. 7 shows an embodiment of a dairy capsule with a frother. The dairy capsule 700 may be provided with apparatus to froth a dairy product using a series of screens 770 to generate a frothing effect. These screens are mounted in a screen carrier 771 such that the carrier sits near the bottom 711 of capsule 700. A dairy container 760 is inserted into dairy capsule 700 with the dairy container including a foil cup 761 with tearing creases 762 in the bottom thereof. The dairy container 760 is filled with milk in one embodiment and a top foil lid 763 is sealed onto a lip 764 of foil cup 761 to prevent oxygen from interacting with the dairy product or milk 765 within cup 761. An adhesive 766 is provided around the periphery of lip 764 to be able to seal foil lid 763 to cup 761. In one embodiment, nitrogen gas 767 is injected into the top of foil cup 761 prior to sealing so as to eliminate any possibility of oxygen spoiling the milk product.

In operation, the foil cup 761 is inserted into the dairy capsule 700 at which point the sealed cup and the dairy pod are moved against a piercing conduit end 731 that pierces the bottom 711 of dairy pod 700 as illustrated at 730. Additionally, steam or hot fluid can be injected into foil cup 761 via conduit 780 to provide pressurized steam or hot fluid that evacuates the milk in foil cup 761 through tearing creases 762 and into the bottom of the dairy capsule 700 where the screens 770 froth the mixture prior to the mixture being evacuated through conduit 731 as illustrated by arrows 732.

The result of the use of the dairy capsule means that refrigeration is not required in order to provide a complex beverage involving a dairy product. Additionally, the encapsulation of the dairy product in the dairy capsule prevents spillage that sometimes accompanies the use of dairy products in brewing machines. Moreover, the use of the dairy product encased in a sealed oxygen-free container eliminates the problem of refrigeration for any dairy products.

Figure 8:
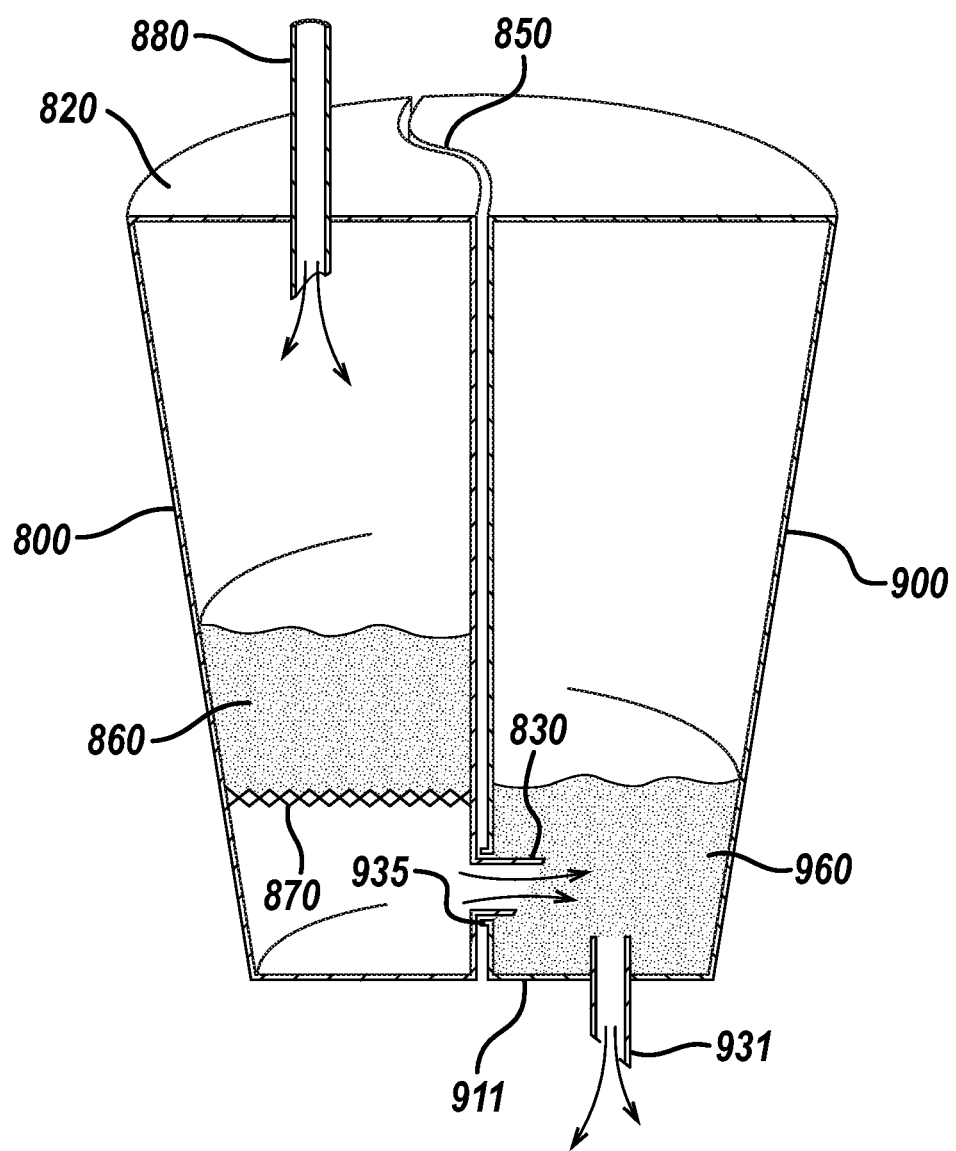
FIG. 8 shows a schematic cross-sectional view of a capsule according to another embodiment of the present invention.

FIG. 8 shows a capsule system according to a side-by-side arrangement of the invention comprising first and second capsules 800 and 900. The first capsule 800 contains a beverage brewing ingredient 860, such as ground coffee, and a layer of filter material 870 provided inside the capsule 800. The beverage brewing ingredient 860 is deposited on top of the filter layer 870 inside the capsule 800. The second capsule 900 contains a dairy product 960, such as powdered milk.

The first and second capsules 800 and 900 connect together with an interengaging fit 850. The first capsule 800 has a liquid outlet 830 that mates with a liquid inlet 935 in the second capsule 900. When fitted together, the dimensions of the combined first and second capsules 800 and 900 provide an overall size and shape which is substantially similar to a conventional single capsule, for example as shown in FIGS. 1 and 2. In this way, the combined first and second capsules 800 and 900 may be used in a conventional food or beverage preparation equipment without modification of the equipment. Optionally, the first and second capsules 800 and 900 may have different external colours or appearances, such that when joined the two capsules provide a desirable appearance.

In use, the capsule system is held inside a clamp of a beverage making apparatus (not shown). The beverage preparation apparatus comprises a source of water (not shown), suitably a source of hot water, for supplying water to an injection tube 880 that pierces the lid 820 of the first capsule 800 to inject water into the first capsule 800 for preparation of the beverage therein. The brewed beverage then passes through the filter material 870 of the first capsule 800 and exits through the outlet 830 into the second capsule 900, where the hot beverage mixes with the powdered milk 960 to form a mixture of brewed beverage and dairy product. This beverage mixture then escapes from a liquid outlet tube 931 that pierces the bottom 911 of the second capsule 900 and thereon into a beverage receiving receptacle (not shown) ready for consumption.

The above embodiments have been described by way of example only. Many other embodiments falling within the scope of the accompanying claims will be apparent to the skilled reader. Therefore, although the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

Any feature that has been described above in relation to any one aspect or embodiment of the invention is also disclosed hereby in relation to all other aspects and embodiments. Likewise, all combinations of two or more of the individual features or elements described above may be present in any aspect or embodiment. For brevity, all possible features and combinations have not been recited in relation to all aspects and embodiments, but they are expressly contemplated and hereby disclosed.

The invention claimed is:

1. A system for the preparation of a multi-component food product, said system comprising:
   a first capsule and a second capsule, each of the first and second capsules comprising a base having an outlet opening and a sidewall extending from the base, the base and the sidewall defining a hollow area having an open top end;
   a first component of the multi-component food product contained within the hollow area of the first capsule;

a second component of the multi-component food product contained within the hollow area of the second capsule; and wherein the first capsule nests within the second capsule so that a bottom portion of the first capsule that comprises the base of the first capsule is positioned within the hollow area of the second capsule and the base of the first capsule is maintained spaced apart from the second component of the multi-component food product, the first and second capsules being in fluid communication.

2. The system of claim 1, wherein the first and second capsules are connected together by a friction fit, screw fit, snap fit, or interlocking fit.

3. The system of claim 1, wherein the second capsule comprises a ledge extending from an inner surface of the sidewall and into the hollow area of the second capsule adjacent to the open top end of the hollow area of the second capsule, and wherein the first capsule comprises a recess in an outer surface of the sidewall adjacent to the base, and wherein the ledge of the second capsule nests within the recess of the first capsule to maintain a space between the base of the first capsule and the second food component in the second capsule.

4. The system of claim 1, wherein each of the first and second capsules comprises a first screw thread on an inner surface of the sidewall adjacent to the open top end of the hollow cavity and a second screw thread on an outer surface of the sidewall adjacent to the base, the second screw thread of the first capsule mating with the first screw thread of the second capsule to couple the first and second capsules together.

5. The system of claim 1, wherein the first capsule comprises a filter disposed within the hollow area, and wherein the first component of the multi-component food product comprises a brewable beverage ingredient positioned atop of the filter.

6. The system of claim 5, wherein the second capsule comprises a frother disposed within the hollow area, and wherein the second component of the multi-component food product comprises a dairy product positioned between the frother and the open top end of the hollow area of the second capsule.

7. The system of claim 1, wherein the first and second capsules have the same external shape.

8. The system of claim 1, wherein the multi-component food product is selected from the group consisting of: soup, baby-food, pet-food, coffee, tea, or juice.

9. The system of claim 1, wherein the first and second capsules contain a component selected from the group consisting of: ground coffee, instant coffee, leaf tea, soup, juice, baby-food, pet-food, wine, alcoholic spirit, a food additive, a food extract, a food supplement such as protein or vitamin, flavouring, sweetener, anti-oxidant, effervescent, colourant, and a dairy product such as milk or cream.

10. The system of claim 1, wherein the multi-component food product is coffee or tea, at least one of the first and second components is brewable coffee or tea, and the other of the first and second components is a dairy product.

11. The system of claim 1, wherein the first and second components are different from one another.

12. The system of claim 1, wherein the first and second components are the same.

13. A multi-component food preparation system comprising:
a first capsule and a second capsule, each of the first and second capsules comprising a base having an outlet opening and a sidewall extending from the base, the base and the sidewall defining a hollow area having an open top end;
a first component of a multi-component food product contained within the hollow area of the first capsule;
a second component of the multi-component food product contained within the hollow area of the second capsule;
wherein the second capsule is configured to receive a portion of the first capsule that includes the base in the hollow area of the second capsule so that the hollow area of the first capsule is in fluid communication with the hollow area of the second capsule.

14. The system of claim 13 wherein the first and second components of the multi-component food product are different from one another.

15. The system of claim 13 wherein the first and second components of the multi-component food product are the same.

\* \* \* \* \*